United States Patent [19]

Watanabe

[11] 4,050,418
[45] Sept. 27, 1977

[54] CONTROL SYSTEM FOR STEAM GENERATOR

[75] Inventor: Takao Watanabe, Hitachi, Japan

[73] Assignee: Hitachi, Ltd., Japan

[21] Appl. No.: 594,002

[22] Filed: July 8, 1975

[30] Foreign Application Priority Data

July 8, 1974 Japan .................................. 47-77285

[51] Int. Cl.$^2$ ........................... F22B 1/06; F22D 5/26
[52] U.S. Cl. .................................. 122/451 R; 122/32; 176/20 R; 165/40
[58] Field of Search .................. 122/32, 406 R, 406 S, 122/448 R, 448 S, 451 R, 451 S; 165/40; 176/20, 65

[56] References Cited

U.S. PATENT DOCUMENTS

| | | | |
|---|---|---|---|
| 3,126,053 | 3/1964 | Brunner | 165/40 |
| 3,247,069 | 4/1966 | Powell et al. | 176/65 |
| 3,253,994 | 5/1966 | Kagi | 176/65 |
| 3,349,003 | 10/1967 | Kagi | 122/406 |
| 3,369,971 | 2/1968 | Kagi | 176/20 |
| 3,434,924 | 3/1969 | Pouderoux | 176/65 |

*Primary Examiner*—Kenneth W. Sprague
*Attorney, Agent, or Firm*—Craig & Antonelli

[57] ABSTRACT

Heat produced in a fast breeder reactor is introduced out of the reactor by liquid sodium into an intermediate heat-exchanger where the heat is transferred to the secondary coolant sodium. In an evaporator, vapor is generated by heat-exchange between the secondary coolant sodium and feed-water supplied thereto through a feed-water valve. In a superheater, superheated vapor is obtained through heat-exchange between the secondary coolant sodium and the vapor supplied from the evaporator. The superheated vapor is introduced into a turbine to drive the same. A permissible vapor temperature which is higher than a saturated temperature is established in dependence on the vapor pressure at the outlet of the evaporator. The flow rate of the feed-water is reduced by closing the feed-water valve when the vapor temperature at the outlet of the evaporator is close to the saturated temperature. The result is that the super-heater is prevented from suffering from the damage of liquid water because the super-heater is weak in liquid water.

10 Claims, 8 Drawing Figures

CONTROL SYSTEM FOR STEAM GENERATOR

BACKGROUND OF THE INVENTION

This invention relates to a steam generator which comprises an evaporator for producing vapor from the feed-water and a super-heater for further heating the vapor produced and which generates steam through heat-exchange between feed-water and alkaline metal. More particularly, this invention relates to a control system for the steam generator for preventing liquid water content from entrance into the super-heater.

A steam generator where heat-exchange is made between alkaline metal and feed-water is employed in a fast breeder reactor, for example. The alkaline metal is used as a coolant carrying the heat produced in the nuclear reactor to exterior. The steam generated by the steam generator drives a turbine generator.

A rough construction of the steam generator is as follows: A closed tank receives at its one end a high temperature alkaline metal fed from the nuclear reactor while feeds from its other end the alkaline metal cooled as a result of heat exchange back to the nuclear reactor. The closed tank is passed through by a plurality of heat transfer tubes each of which permits the feed-water to pass therethrough. The thermal energy of the alkaline metal is transferred to the feed-water through the heat transfer tube thereby producing water vapor.

Liquid sodium is most preferable as the coolant alkaline metal for heat transfer in the nuclear reactor, from its property and economic standpoints. On the other hand, the liquid sodium belonging to the alkaline metal group with a high activity exhibits a remarkably high chemical activity, and reacts violently with water into explosive burning. In the fast breeder reactor, the steam generator is the place having the highest possibility that the alkaline metal comes in direct contact with water. Since the steam generator is located between the nuclear reactor and the turbine generator, if the alkaline metal should come in direct contact with water, not only the steam generator but also other apparatuses including the turbine generator and the nuclear reactor which constitute the whole nuclear power plant might be all damaged. Thus, the steam generator is very important, from a safty point of view. Such decident almost depends on the mechanical soundness of the heat-transfer tubes. The damage of the heat-transfer tubes is due largely to the thermal fatigue when it is subjected to a high temperature, the corrosion by moisture content, or the like. First, the heat transfer tube portions existing in the region where the vapor produced is superheated must be proof against very high temperature and must be strong against fatigue since both the alkaline metal and the steam flowing in such portion are at a very high temperature. Next, the heat transfer tube portions existing in the region (boiling region) where feed-water flows must be proof against water corrosion. Accordingly, in the steam generator in which the superheated portion and the vapor producing portion are integrally provided, the material of the steam generator should withstand both the high temperature and water corrosion. No material satisfying such two requirements has been found. This results in the advent of the so-called separate type steam generator where the evaporator and the super-heater are separately provided, so that factors which affect the damage of the heat-transfer tubes may be eliminated and the optimum materials for the evaporator portion and for the super heater portion may be individually selected. More precisely, for the evaporator, for example, 2¼ C - 1 Mo steel may be used as the material being resistive to the water corrosion. For the super heater, austenitic stainless steel, for example, may be used as the material durable for a high temperature. In this manner, the heat-transfer tubes are remarkably prevented from the damage thereof.

As described above, for the purpose of prevention of the heat-transfer tubes from the damage, the evaporator and the super-heater have been separately provided in the steam generator, and the materials most suitable for the respective portions have been selected. However, it has been found that the austenitic stainless steel which is the material for the super-heater is weak in liquid water content and hence if liquid water is entered into the super-heater, the heat-transfer tubes on the super-heater are adversely affected. In a rated operation of the nuclear power station, the super heat starting point of the water is located in a given position in the evaporator and the vapor produced therein is entered to the super-heater after it is further heated. For this, the entrance of liquid water content into the super-heater may be almost eliminated. However, when the flow rate of alkaline metal is reduced for decreasing the load of the nuclear power station, the super heat starting point of the water shifts to the outlet side of the evaporator with the result that liquid water content possibly enters the super-heater thereby damaging the heat-transfer tubes.

SUMMARY OF THE INVENTION

Accordingly, an object of the present invention is to provide a control system for a steam generator of the separate-type separately provided with an evaporator and a super-heater for effecting heat-exchange, in which the changes in load are rapidly detected to thereby prevent liquid water content from entering the super-heater.

According to the present invention, the changes in load of the separate type steam generator are rapidly detected in the following manner: In the fast breeder reactor, the changes in load are transmitted to the steam generator as the corresponding changes in the flow rate of the coolant sodium in order to relieve the thermal impact to the apparatus of the nuclear power plant. This invention is based on the fact that the vapor temperature at the outlet of the evaporator (the inlet of the super-heater) is quickly responsive to the changes in load. For preventing liquid water from entering the super-heater, the pressure and temperature of the vapor at the inlet of the super-heater is detected so as to detect the vapor condition relating to the possibility of the entrance of liquid water into the super-heater, from the relationship between the detected pressure and temperature.

DETAILED DESCRIPTION OF THE PREFERRED EMBODIMENT

Figure 1:
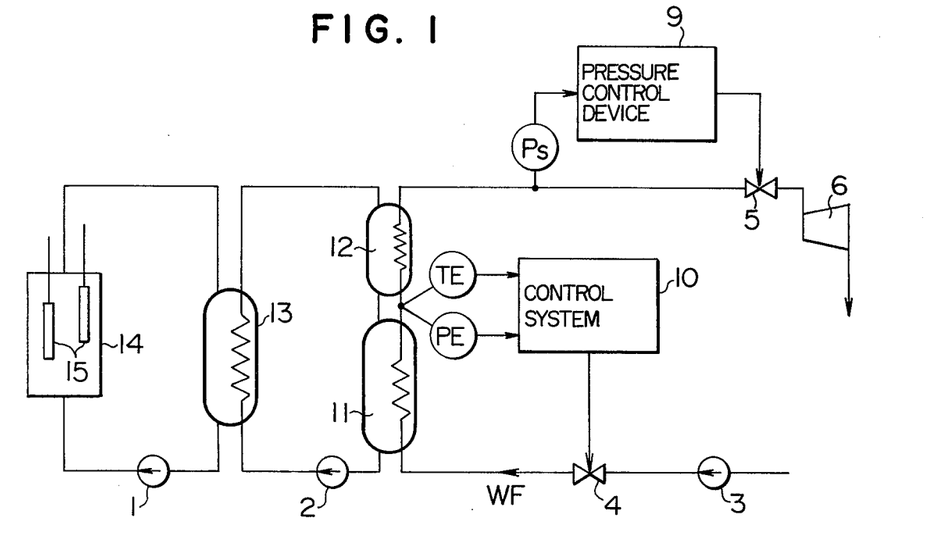
FIG. 1 is a schematic diagram showing the construction of a fast breeder type nuclear power station as an example of a plant which employs a separate type steam generator.

Referring now to FIG. 1, there is schematically shown a fast breeder type nuclear power station as one example of a nuclear power plant employing a so-called separate type steam generator. In the figure, reference numerals 14 and 15 designate a nuclear reactor and a control rod for controlling an output of the nuclear reactor, respectively. Alkaline metal such as liquid sodium is used as a coolant of the nuclear reactor 14, and it is introduced to the nuclear reactor by a pump 1. The heat produced in the nuclear reactor 14 is carried out of the nuclear reactor by the primary coolant sodium to exterior and is introduced into an intermediate heat exchanger 13 where the heat is transferred to the secondary coolant. Also in the case of the fast breeder reactor, liquid sodium is used as the secondary coolant. A pump 2 is used to cause the secondary coolant sodium to flow. The steam generator mentioned above is comprised of an evaporator 11 and a super-heater 12. The secondary coolant sodium flows through the primary side of the steam generator, while water flows through the secondary side of the same. Steam produced from the water as a result of heat exchange between the water and the secondary coolant sodium is supplied through an adjusting valve 5 to a turbine 6 to drive the same. A pressure control device 9 controls the opening of the adjusting valve 5 so as to provide a given pressure of the steam supplied to the turbine 6. Ps designates the pressure at the inlet of the adjusting valve 5. A detailed explanation of the pressure control device 9 is omitted because it it not essential to this invention. Reference numerals 3 and 4 designate a feed-water pump and a feed-water valve, respectively, and reference numeral 10 designates a control system essential to the present invention. The control system 10 serves to control the amount of feed-water in response to the pressure PE and the steam temperature TE at the outlet of the evaporator 11. More particularly, the control system 10 controls the opening of the feed-water valve 4. The schematic construction of the fast breeder type nuclear power station as one form of nuclear power plants using the separate type steam generator, is as just mentioned.

Figure 4:
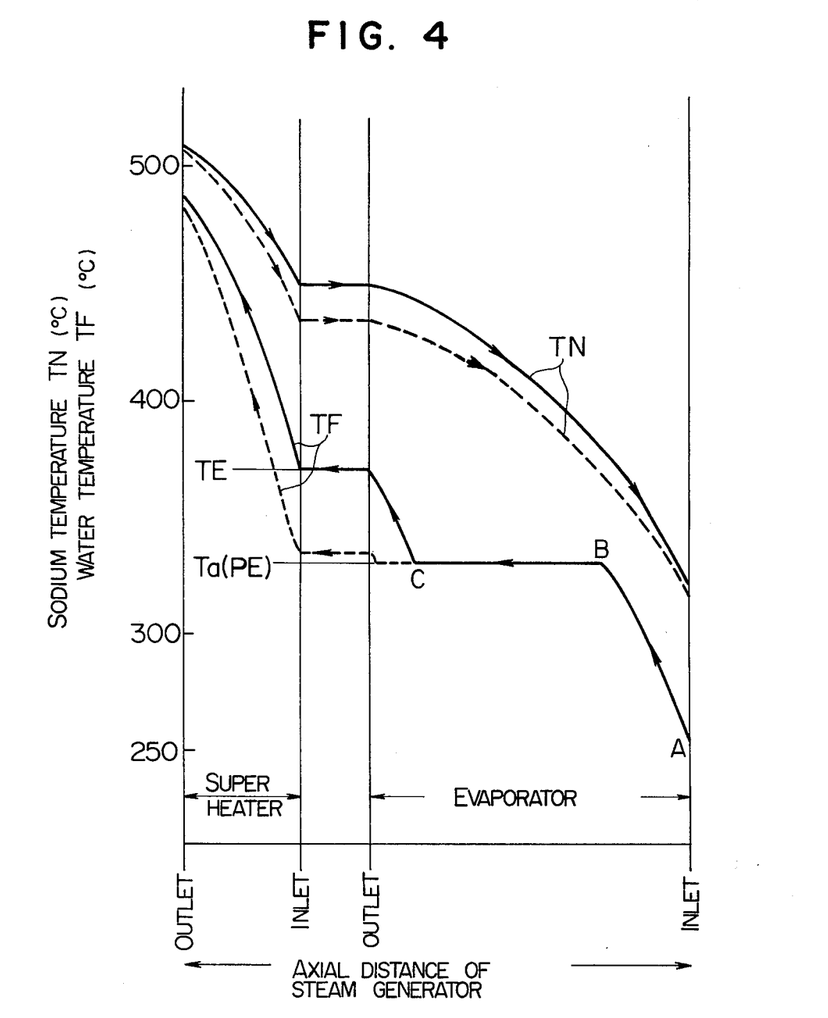
FIG. 4 is a graph illustrating the distributions of the sodium temperature and the feed-water temperature along the evaporator and super-heater portions in the steam generator.

Turning now to FIG. 4, an example of temperature distributions of the secondary coolant sodium end of the water along the evaporator 11 and the super-heater 12 are graphically shown in the drawings. In the graph, the abscissa shows the axial distance of the steam generator the left and right portions of which show the respective axial distances of the evaporator and the super heater. The water flows in the steam generator from right to left and the secondary coolant sodium from left to right in the graph. The ordinate shows the water temperature TF and the sodium temperature TN. The curves depicted by solid lines designate the temperature distributions in the steam generator when the flow rate of the secondary coolant sodium is 100%, while the curves depicted by dotted lines indicate those when the flow rate of the secondary coolant sodium is reduced. The flat region in those temperature distribution curves existing between the super heat portion and the evaporator portion correspond to the coolant pipe between the evaporator 11 and the super-heater 12. As seen from the graph, when the secondary coolant sodium passes through the steam generator at the 100% flow rate, the sodium temperature TN drops from about 510° to 320° C, while the water temperature TF rises from about 250° to 490° C. In the graph, the water is in a liquid state during the right end rising portion A-B of the curve TF and is in a combination of liquid water and vapor during the flat portion B-C following the right end rising portion A-B. The flat portion B-C of the curve TF shows the water temperature distribution substantially at the middle portion of the evaporator 11. The temperature of the water containing liquid water and vapor is about 335° C at the flat portion B-C, and the pressure PE at the outlet of the evaporator 11 is 140 Kg/cm$^2$. The temperature 335° C, here, is the saturation temperature Ta(PE) of the water which is determined decidedly when the pressure PE is 140 Kg/cm$^2$. The curve TF rises again near the outlet of the evaporator 11. The inflection point C where the flat portion B-C of the curve TF is bent upward is the super heat starting point at which the mixture of liquid water and vapor is turned into vapor steam. The water must be in a vapor steam state at the inlet of the super-heater 12 in order to prevent liquid water from entering the super-heater 12. Since there is no heat exchange between the water and the sodium in the region between the outlet of the evaporator 11 and the inlet of the super-heater 12, the respective temperatures TF and TN remain constant in this region. Thus, the water must be vapor steam at the outlet of the evaporator 11 in order to prevent the liquid water from entering the super-heater 12. Accordingly, the axial lengths of the respective parts of the steam generator and the temperatures of the sodium and the water must be so selected that the super heat starting point of the water is positioned in the evaporator 11. The vapor steam is additionally heated in the super heater to be superheated vapor steam. On the other hand, the temperature of the secondary coolant sodium gradually drops due to the heat exchange between the coolant sodium and the water. It is important to place the super heat starting point in the intermediate region of the evaporator 11. If the flow rate of the secondary sodium is reduced, however, the super heat starting point shifts from the point C to the point C' placed in the vicinity of the outlet of the evaporator 11, and hence the temperature TE of the water falls. Note that if the temperature TE of the water at the outlet of the evaporator 11 falls to the level of the saturation temperature Ta(PE), there is a high possibility of entrance of the water in liquid state into the super-heater 12. In FIG. 4, the respective curves indicated by dotted lines show the sodium temperature TN and the water temperature TF when the flow rate of the secondary sodium is reduced. It will be seen from the dotted-line curve TF that the temperature of the water is decreased. It is further seen from this graph that the vapor temperature at the outlet of the super-heater 12 changes little while the water vapor temperature TE at the outlet of the evaporator 11 greatly drops. Calculation was made of how the sodium flow rate should be reduced in order to cause the water vapor temperature TE at the outlet of the evaporator 11 to fall to the level of the saturation temperature Ta(PE), on the assumption that the sodium flow rate is 100 % and the water vapor temperature TE at the outlet of the evaporator 11 is 370° C. This calculation shows that the limit of the sodium flow rate to be reduced is about 5% if no control is applied to the system. The water vapor temperature TE at the outlet of the evaporator is sensitive in change due to various disturbances in addition to the reduction of the sodium flow rate. This is one of features of the steam generator. From the foregoing description, it will be seen that it is most effective to monitor the reduction of the water vapor temperature TE at the outlet of the evaporator which is remarkably responsive to disturbances, for the purpose of preventing liquid water from entering the superheater 12. The conceivable reasons why the vapor temperature TE at the outlet of the evaporator 11 is more sensitive to disturbances than the vapor temperature at the outlet of the super-heater 12 are as follows:

a. The temperature difference between the sodium and the water at the outlet of the evaporator is larger than that at the outlet of the super-heater;

b. The temperature gradient of the water side at the outlet of the evaporator is larger than that at the outlet of the super-heater.

Figure 2:
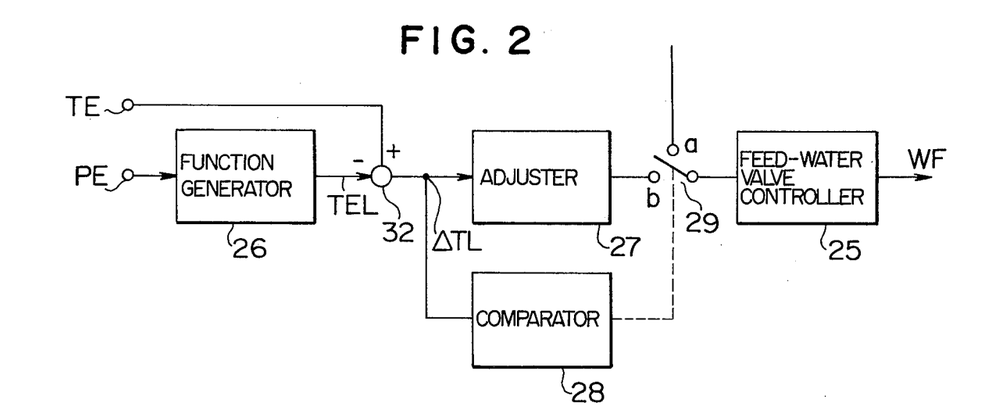
FIG. 2 is a block diagram showing an embodiment of a control system according to the present invention in which a permissible lower limit temperature is established in accordance with the vapor pressure at the output of the evaporator.
Figure 3:
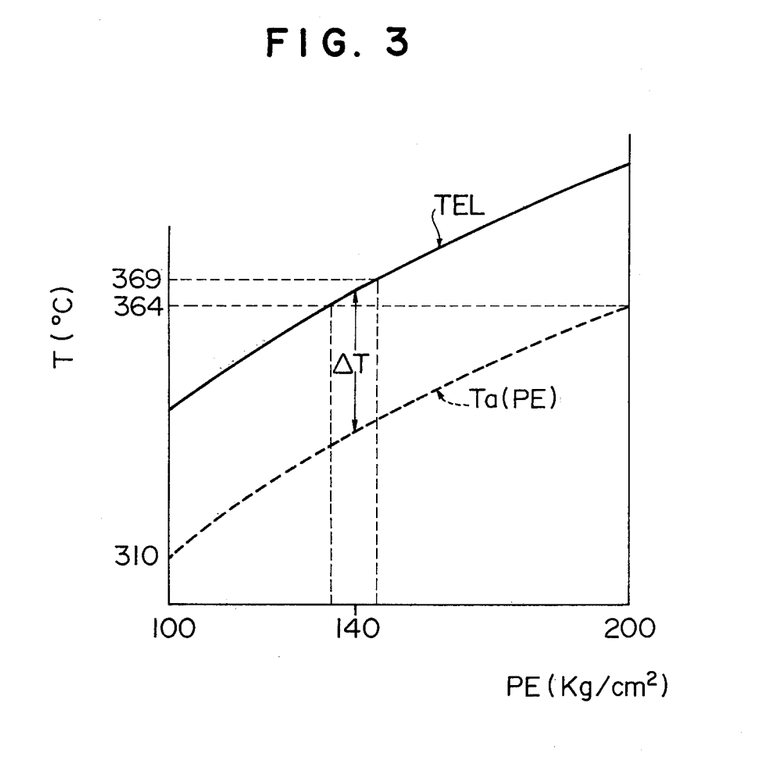
FIG. 3 is a graph illustrating the relationship among the vapor pressure, the saturated temperature, and the permissible lower limit temperature.

Referring now to FIG. 2, there is shown in block form an embodiment of the control system 10 according to the present invention, which receives at its inputs the temperature TE at the evaporator outlet and the pressure PE at the same outlet. In FIG. 2, a function generator 26 receives the pressure PE and produces the permissible temperature TEL corresponding to the pressure PE. FIG. 3 shows the characteristic of the function generator 26. It is evident that any function generator may be used if it has such a characteristic as shown in FIG. 3. Generally, the pressure at the outlet of the evaporator is about 140 Kg/cm² and the pressure at the outlet of the super-heater 12 is about 133 Kg/cm². Accordingly, the range from 100 Kg/cm² to 200 Kg/cm² will suffice for the characteristic of the function generator used in the control system of this invention. A curve depicted by a dotted line in this graph is the saturation temperature Ta(PE) corresponding to the temperature PE. The permissible temperature TEL, or the allowable lower limit of the vapor temperature at the outlet of the evaporator, has a margin of $\Delta T°$ C in addition to the temperature TE. Therefore, the permissible temperature TEL is expressed as $TEL = Ta(Te) + \Delta T$. The margin $\Delta T$ may be selected to be 25° C for example and means is provided so that an alarm is issued when the vapor temperature TE falls to be 10° C above the permissible temperature TEL and that the super heater is isolated from the evaporator when it falls to be below the permissible temperature TEL. The thus obtained permissible temperature TEL is applied to an adder 32 where the difference $\Delta TL$ between the permissible temperature TEL and the actual vapor temperature TE at the evaporator outlet is obtained. An adjuster 27 receives the difference $\Delta TL$ and produces an output in accordance with the difference $\Delta TL$. A comparator 28 operates in response to the difference $\Delta TL$, and, when the difference $\Delta TL$ decreases to be a predetermined value, e.g. zero, it actuates a movable contact 29 to contact with the output $b$ of the adjuster 27 thereby to permit the output of the adjuster 27 to be applied to a feed-water valve controller 25. The state that the difference $\Delta TL$ is below zero means that the vapor temperature TE is below the permissible temperature TEL. In this state, the flow rate of the feed-water is reduced by the control system for preventing liquid water from entering the super heater 12. The fact that the vapor temperature TE at the outlet of the evaporator 11 falls under a constant flow rate of the feed-water implies that the quantity of heat of the sodium reduces. Thus, the vapor temperature TE may be increased by reducing the flow rate of the feed-water. If the vapor temperature TE is increased in such a way, it is prevented from falling to the level of the saturation temperature Ta(PE) and thus no water in liquid state is entered into the super heater 12. The comparator 28 actuates the movable contact 29 to contact with the terminal $a$ at least when the vapor temperature TE is larger than the permissible temperature TEL, i.e. TE > TEL. In this way, the flow rate of the feed-water is temporarily reduced in response to the decrease of the vapor temperature TE at the outlet of the evaporation 11, thereby to prevent liquid water from entering the super heater 12.

Figure 5:
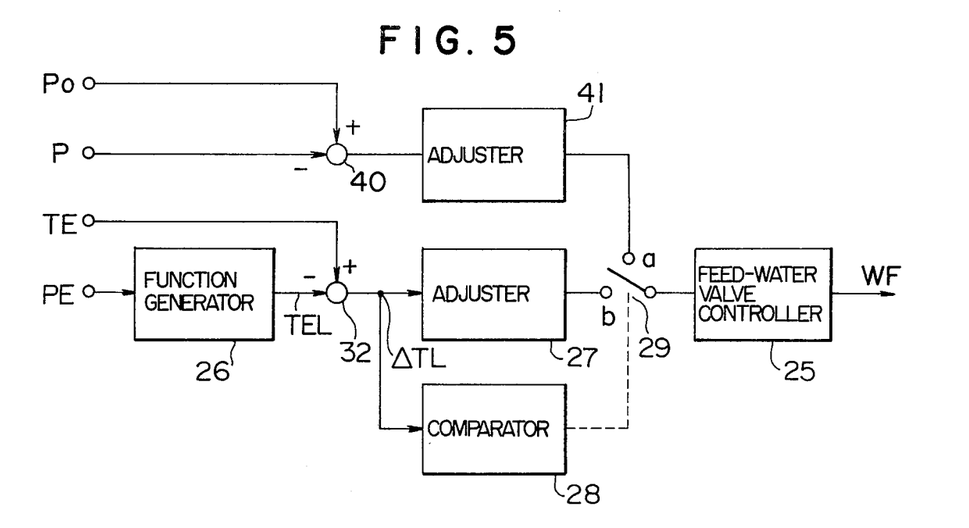
FIG. 5 is a block diagram showing another embodiment of the present invention, in which a normal control system by which the flow rate of the feed-water is normally controlled so that the power output of an electric generator is maintained constant is provided in addition to the embodiment of FIG. 2.

It is to be noted that, in the embodiment of FIG. 2 according to the present invention, the feed-water valve is not in a non-controlled condition normally, but it is always controlled in accordance with various conditions. That is, the control system shown in FIG. 2 is exclusively used to control the feed-water supply when the vapor temperature TE abnormally falls. Normally, the contact 29 comes in contact with the terminal $a$ and another control system connected to the terminal $a$ control the flow rate of the feed-water normally. Control systems shown in FIGS. 5, 6 and 7, for example, may be employed as such another control system. The control system shown in FIG. 5 is used for controlling the flow rate of the feed-water WF so as to maintain the power output P of an electric generator at a constant level. In this control system, the deviation of the output P from a reference value $P_o$ is detected in an adder 40 and the flow rate of the feed-water is so controlled that the actual power output P is equal to the reference $P_o$ by means of an adjuster 41, the contact 29, and the feed-water valve controller 25. In the case of the nuclear power plant with no electric generator, the power output of the electric generator in this example may be replaced by the output of the steam generator which is, for example, the flow rate of the steam produced or the steam pressure.

Figure 6:
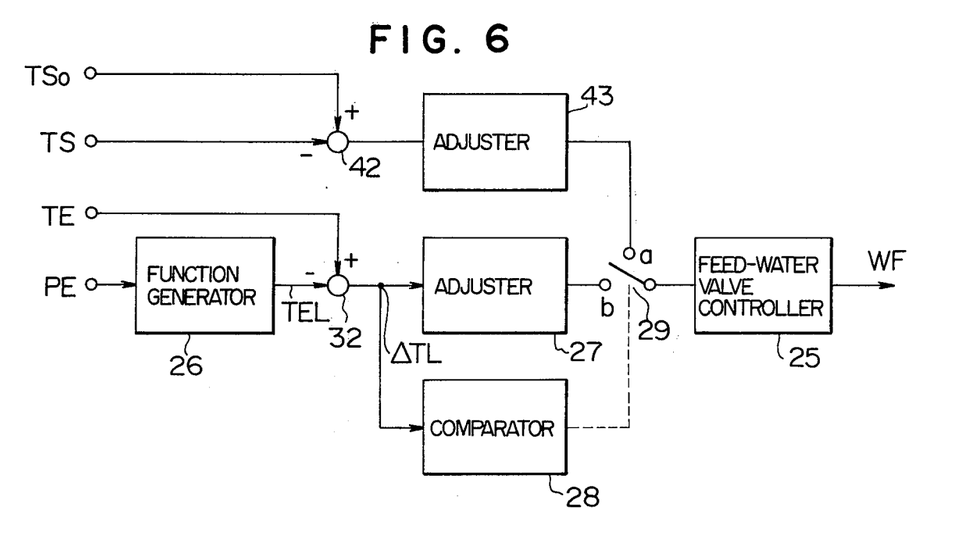
FIG. 6 is a block diagram showing still another embodiment of the present invention, in which a normal control system by which the flow rate of the feed-water is normally controlled so that the main steam temperature is maintained constant.

FIG. 6 shows another embodiment of the control system for controlling the flow rate WF of the feed-water so as to obtain a constant temperature of main steam. In the control system of FIG. 6, the deviation of the main steam temperature TS from a reference value $TS_o$ is detected by an adder 42, and a circuitry comprising an adjuster 43, the contact 29, and the feed-water valve controller 25 controls the flow rate of the feedwater is so controlled that TS is equal to $TS_o$ by means of an adjuster 43, the contact 29 and the feed-water valve controller 25.

Figure 7:
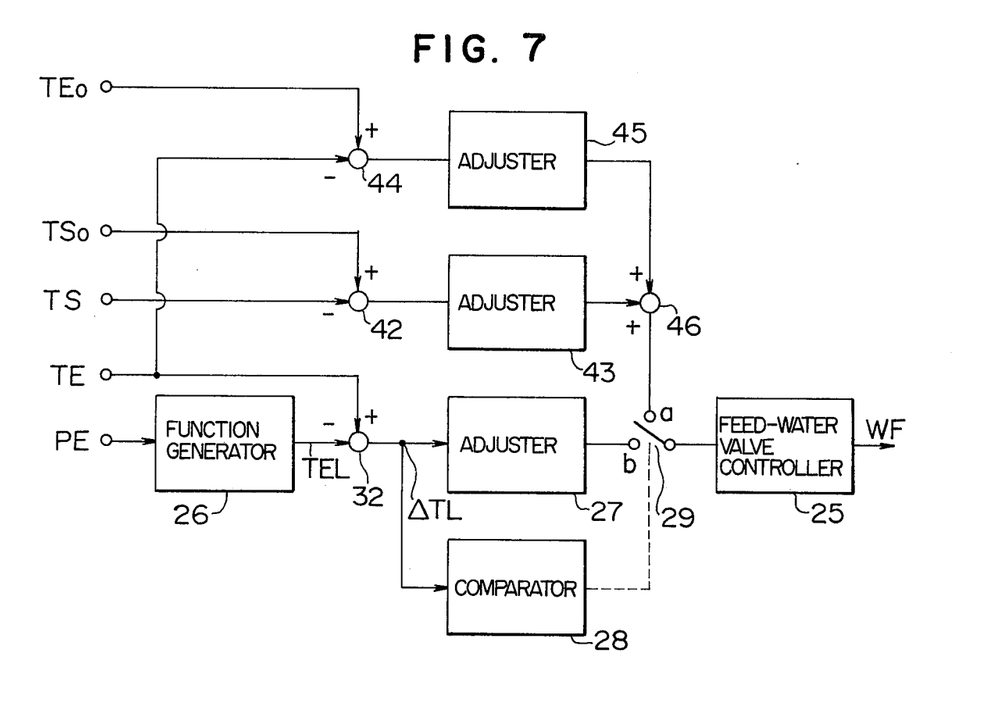
FIG. 7 is a block diagram showing a modification of the embodiment of FIG. 6 in which the vapor temperature at the outlet of the evaporator is employed as a preceding signal so that the response in normal operation is more improved.

The control system shown in FIG. 7 is an improvement of the control system of FIG. 6 so that the former may operate more quickly than the latter. Quick response in operation is obtained by using the temperature difference $\Delta TE$ from the vapor temperature TE at the outlet of the evaporator 11. This is based on the fact that, as previously stated referring to FIG. 4, the change of the main steam temperature, namely the vapor temperature at the outlet of the superheater 12, is not so large as that of the vapor temperature TE at the evaporator outlet. In FIG. 7, reference numeral 44 designates an adder by which a deviation of the vapor temperature TE at the evaporator outlet from a reference value $TE_o$ is detected and 45 designates an adjuster. The respective outputs of the adjusters 43 and 45 are added by an adder 46. The adjuster 43 for the main steam temperature TS is a proportional integrator element and the adjuster 45 for the vapor temperature TE at the evaporator outlet is a proportional element. Thus, the flow rate WF of the feed-water is first determined by the output of the adjuster 45 and then by the output of the adjuster 43. By this control system the flow rate of the feed-water is so controlled that the main steam temperature TS is maintained constant, resulting in an excellent response in operation.

As described above, in each of the embodiments of FIGS. 5, 6 and 7, the flow rate of the feed-water is normally controlled so that the power output P of the electric generator as well as the main steam temperature TS are constant. When there occurs a possibility that liquid water may be entered into the super-heater 12, such a normal control system is separated from the control system 10 so that the flow rate of the feed-water is reduced rapidly to recover the vapor temperature at the outlet of the evaporator 11, thereby preventing liquid water content from entering the super-heater 12. After the vapor temperature TE at the outlet of the evaporator 11 recovers, the contact 29 is changed over to connect the above-mentioned normal control system to cause it to act its routine control. In the description concerning FIGS. 1, 2, 5, 6 and 7, the feed-water valve was used as a means for reducing the flow rate of feed-water in order to prevent liquid water from entering the super-heater. This effect, however, may be attained by controlling the speed of the water feed pump.

Figure 8:
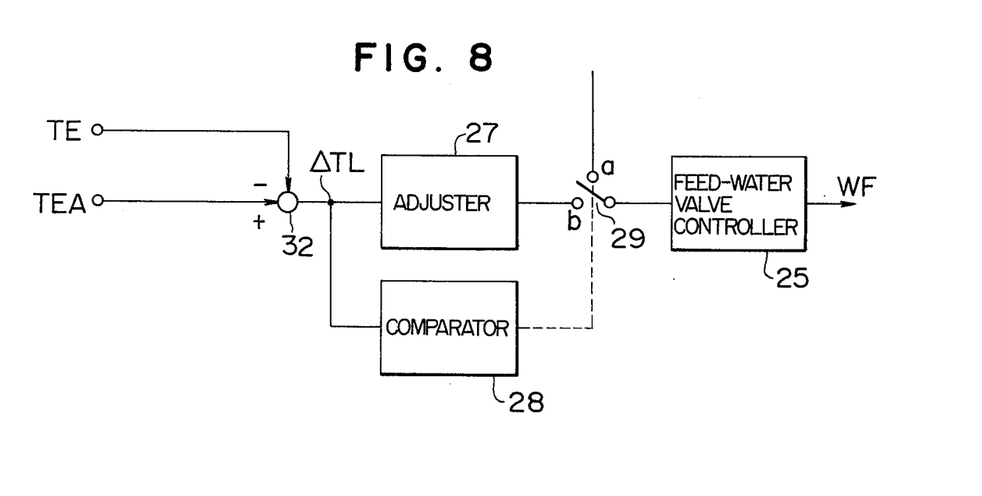
FIG. 8 is a modification of the present invention in which the permissible temperature is determined to be a constant value under the condition that the change of the vapor pressure at the outlet of the evaporator is negligible small.

Another embodiment of this invention is shown in FIG. 8. In the embodiment heretofore mentioned, the result of comparison of the actual vapor temperature at the outlet of the evaporator with the permissible temperature TEL determined in dependence on the pressure PE at the same outlet is used for detecting the possibility of the entrance of the liquid water into the super-heater 12. As seen from FIG. 3 plotting the pressure vs. the temperature, the pressure PE at the outlet of the evaporator exhibits a relatively small change. Accordingly, it may be considered that the pressure is constant. That is, the entrance of liquid water into the super-heater may be prevented without taking the pressure factor into account, if a permissible temperature is preset correspondingly to the maximum pressure in the range of minor change of pressure and this permissible temperature is compared with the vapor temperature at the outlet of the evaporator. The FIG. 8 shows an embodiment based on this idea. In FIG. 8, like reference numerals are used to designate like portions in FIG. 7.

The difference of this instance from the embodiment of FIG. 2 is in that the pressure factor is not taken into consideration. In this instance, a permissible temperature TEA at the outlet of the evaporator 11 is preset correspondingly to the possible maximum pressure. FIG. 3 will be referred to for explaining the way of this presetting of the permissible vapor temperature TEA. Assume that the pressure PE ranges in change from 135 $Kg/cm^2$ to 145 $Kg/cm^2$. The permissible temperature TEL of about 369° C is obtained correspondingly to the maximum pressure 145 $Kg/cm^2$ from this graph. When this permissible temperature of 369° C is employed as a permissible temperature TEA for the super-heater protection, it can secure the safty since the permissible temperature is about 364° C when the pressure is lowered to 135 $Kg/cm^2$. In the case the temperature of 369° C is employed as the permissible temperature TEA for the super-heater protection, it is desirable that the reference value $TE_o$ of the vapor temperature at the outlet of the evaporator 11 is preset more than 369° C, otherwise the protecting system of vapor heater frequently operates.

As mentioned above, this invention may be embodied without taking the pressure component into consideration, and the output of a normal control system is normally applied to the terminal *a* of the contact 29. This output of the normal control system normally applied to the terminal *a* of the contact 29 may be the output of the adjuster 41 obtained in such a manner as described with respect to FIG. 5 when the electric power control system is employed, and alternatively it may be the output of the asjuster 43 obtained in such a manner as described with respect to FIG. 6 when the main steam temperature control system is employed. The output of the adder 46 of FIG. 7 may also be applied to the terminal *a* of the contact 29 of FIG. 8. In this case, it is preferable that the reference value $TE_o$ of the vapor temperature at the outlet of the evaporator is preset more than 369° C, for example 375° C, when the permissible value TEA of the vapor temperature at the outlet of the evaporator is selected to be 369° C as in the previous case. If so, frequent operation of the super-heater protection system may be prevented.

In the circuits of the embodiments heretofore described, the switching operation from the normally operating control system to the super-heater protection system or control system for protecting super-heater is performed by the comparator 28 monitoring the difference $\Delta TL$ between the permissible temperature TEL and the vapor temperature TE at the outlet of the evaporator. The control system for protecting superheater operates to reduce the flow rate of the feedwater, and then the condition of the vapor at the outlet of the evaporator recovers to cause the comparator 28 to switch the contact 29 to contact with the normal control system. If the condition of switching from the super-heater protection system to the normal control system is the same as that of switching from the normal control system to the super-heater protection system (for example $\Delta TL = 0$), the contact 29 possibly effects its switching operation frequently when TEL = TE. Therefore, it is preferable that the comparater 28 has a hysterisis characteristic in order that the condition of switching from the super-heater protection system to the normal control system is TE > TEL.

I claim:

1. In a steam generator having an evaporator for producing steam by heat-exchange between alkaline metal and feed-water and a super-heater for further heating the steam by heat-exchange between the steam produced by said evaporator and alkaline metal, an improved control system for the steam generator comprising:

a vapor temperature detector for detecting the vapor temperature at the outlet of said evaporator;

a vapor pressure detector for detecting the vapor pressure at the outlet of said evaporator;

first means receiving the outputs of said vapor temperature detector and said vapor pressure detector to thereby detect the fact that the vapor is in such a condition that liquid water may possibly enter into said super-heater and produce an output; and second means for reducing the flow rate of the feed-water to be supplied to said evaporator, in response to the output of said first means.

2. The improvement according to claim 1, wherein said first means includes:

third means for establishing a permissible lower limit temperature which is higher than the saturation temperature corresponding to the detected vapor pressure, in response to the output of said vapor pressure detector; and fourth means for comparing the output of said third means with the output of said vapor temperature detector to produce an output when the vapor temperature at the outlet of said evaporator becomes lower than the permissible lower limit temperature established by said third means.

3. The improvement according to claim 1, further comprising:

fifth means for controlling the flow rate of the feed-water in the absence of the output of said first means.

4. The improvement according to claim 2, further comprising:

fifth means for controlling the flow rate of the feed-water in the absence of the output of said first means.

5. The improvement according to claim 3, in which said fifth means includes:

sixth means for detecting the output of said steam generator;

seventh means for establishing a reference value of the output of said steam generator;

an adder for obtaining the difference between the respective outputs of said sixth and seventh means; and an adjuster for producing an output in accordance with the output of said adder to thereby control the flow rate of the feed-water in the absence of the output of said first means.

6. The improvement according to claim 4, in which said fifth means includes:

sixth means for detecting the output of said steam generator;

seventh means for establishing a reference value of the output of said steam generator;

an adder for obtaining the difference between the respective outputs of said sixth and seventh means; and an adjuster for producing an output in accordance with the output of said adder to thereby control the flow rate of the feed-water in the absence of the output of said first means.

7. The improvement according to claim 3, in which said fifth means includes:

eighth means for detecting the vapor temperature at the outlet of said steam generator;

ninth means for establishing a reference value of the vapor temperature at the outlet of said steam generator;

an adder for obtaining the difference between the respective outputs of said eighth and ninth means; and an adjuster for producing an output in accordance with the output of said adder to thereby control the flow rate of the feed-water in the absence of the output of said first means.

8. The improvement according to claim 4, said fifth means includes:

eighth means for detecting the vapor temperature at the outlet of said steam generator;

ninth means for establishing a reference value of the vapor temperature at the outlet of said steam generator;

an adder for obtaining the difference between the respective outputs of said eighth and ninth means; and an adjuster for producing an output in accordance with the output of said adder to thereby control the flow rate of the feed-water in absence of the output of said first means.

9. The improvement according to claim 3, in which said fifth means includes:

tenth means for detecting the vapor temperature at the outlet of said steam generator;

eleventh means for establishing a reference value of the vapor temperature at the outlet of said steam generator;

a first adder for obtaining the difference between the respective outputs of said tenth and eleventh means;

a first adjuster for producing an output in accordance with the output of said first adder;

twelfth means for establishing a reference value of the vapor temperature at the outlet of said evaporator;

a second adder for obtaining the difference between the output of said twelfth means and the output of said evaporator outlet vapor temperature detector;

a second adjuster for producing an output in accordance with the output of said second adder; and a third adder for obtaining the sum of the respective outputs of said first and second adders to thereby control the flow rate of the feed-water in absence of the output of said first means.

10. The improvement according to claim 4, in which said fifth means includes:

tenth means for detecting the vapor temperature at the outlet of said steam generator;

eleventh means for establishing a reference value of the vapor temperature at the outlet of said steam generator;

a first adder for obtaining the difference between the respective outputs of said tenth and eleventh means;

a first adjuster for producing an output in accordance with the output of said first adder;

twelfth means for establishing a reference value of the vapor temperature at the outlet of said evaporator;

a second adder for obtaining the difference between the output of said eleventh means and the output of said evaporator outlet vapor temperature detector;

a second adjuster for producing an output in accordance with the output of said second adder; and a third adder for obtaining the sum of the respective outputs of said first and second adders to thereby control the flow rate of the feed-water in absence of the output of said first means.

* * * * *